(12) United States Patent
Schaedler et al.

(10) Patent No.: US 11,547,047 B2
(45) Date of Patent: Jan. 10, 2023

(54) LAWN MAINTENANCE DEVICE HAVING OFFSET WHEELS

(71) Applicant: MTD Products Inc, Valley City, OH (US)

(72) Inventors: Axel Schaedler, Olmsted Falls, OH (US); Jeffery Legan, Valley City, OH (US)

(73) Assignee: MTD PRODUCTS INC, Valley City, OH (US)

( * ) Notice: Subject to any disclaimer, the term of this patent is extended or adjusted under 35 U.S.C. 154(b) by 810 days.

(21) Appl. No.: 15/991,524

(22) Filed: May 29, 2018

(65) Prior Publication Data

US 2019/0364729 A1 Dec. 5, 2019

(51) Int. Cl.
| | |
|---|---|
| *A01D 34/47* | (2006.01) |
| *A01D 67/00* | (2006.01) |
| *A01D 34/81* | (2006.01) |
| *A01D 101/00* | (2006.01) |

(52) U.S. Cl.
CPC ............ *A01D 34/81* (2013.01); *A01D 34/47* (2013.01); *A01D 67/00* (2013.01); *A01D 2101/00* (2013.01)

(58) Field of Classification Search
CPC ......... A01D 34/47; A01D 34/81; A01D 67/00
USPC .......................................................... 56/289
See application file for complete search history.

(56) References Cited

U.S. PATENT DOCUMENTS

| | | | | |
|---|---|---|---|---|
| 2,857,725 | A | * 10/1958 | Canfield ................ | A01D 34/74 56/320.1 |
| 3,093,947 | A | * 6/1963 | Whitman ............... | A01D 34/86 56/17.2 |
| 4,055,036 | A | 10/1977 | Kidd | |
| 4,977,735 | A | 12/1990 | Davis | |

(Continued)

FOREIGN PATENT DOCUMENTS

| | | |
|---|---|---|
| EP | 0696413 A1 | 2/1996 |
| WO | 2019/231995 A1 | 12/2019 |

OTHER PUBLICATIONS

EPC Communication pursuant to Rules 161(1) and 162 EPC for corresponding European Patent Application No. 19731075.8 dated Jan. 19, 2021, 3 pages long.

(Continued)

*Primary Examiner* — Alicia Torres
(74) *Attorney, Agent, or Firm* — Wegman Hessler

(57) ABSTRACT

A lawn maintenance device has a transverse center line, a frame, and a power source including an output shaft attached to the frame. The lawn maintenance device further includes a rotating cutting blade. A left side is located on one side of the transverse center line and a right side located on a second side of the transverse center line. A plurality of ground engaging members are attached to the frame enabling movement of the lawn maintenance device along an associated driven surface. The ground engaging members on the left side are located at a first distance from the transverse center line that is different from a second distance that those on the right side are located from the transverse center line. Another example includes ground engaging members on opposite sides of the lawn maintenance device being located at different distances from a central axis of the cutting blade.

4 Claims, 12 Drawing Sheets

(56) References Cited

U.S. PATENT DOCUMENTS

| | | | | |
|---|---|---|---|---|
| 5,251,429 A * | 10/1993 | Minato | ................ | A01D 34/685 |
| | | | | 180/19.1 |
| 5,465,563 A * | 11/1995 | Heinz | .................... | A01D 34/82 |
| | | | | 56/17.2 |
| 6,038,840 A * | 3/2000 | Ishimori | ................ | A01D 34/66 |
| | | | | 56/13.3 |
| 6,038,842 A | 3/2000 | Quiroga | | |
| 9,516,808 B2 * | 12/2016 | Takaoka | ............... | A01D 34/733 |
| 2016/0052567 A1 * | 2/2016 | Pugh | ...................... | A01D 43/00 |
| | | | | 280/638 |
| 2019/0364729 A1 | 12/2019 | Schaedler et al. | | |

OTHER PUBLICATIONS

Office Action for corresponding Canadian Application No. 3,101,745 dated Feb. 9, 2022, 4 pages.

First Examination Report for corresponding Australian Application No. 2019277233, dated Jul. 28, 2021, 3 pages.

Second Examination Report for corresponding Australian Application No. 2019277233, dated Jul. 22, 2022, 3 pages.

* cited by examiner

LAWN MAINTENANCE DEVICE HAVING OFFSET WHEELS

BACKGROUND

1. Field of the Disclosure

The present disclosure relates to lawn and garden equipment, and more particularly, to a walk behind lawn mower having offset wheels on one side.

2. Description of Related Art

Currently available lawn maintenance devices such as walk-behind mowers, riding mowers, and the like include ground engagement members (e.g., wheels) and a rotating cutting blade configured to cut grass and other vegetation. There are times when the wheels bend grass blades in the direction of the mower's travel. Due to the arrangement of the wheels and their relationship to the edge of the mower deck and/or the edge of the blade cutting radius, there is a relatively short time, distance, and number of blade passes experienced by the bent over grass as it passes under the deck. This issue can lead to undesired strips of uncut or improperly cut grass that can be noticeable. The problem can be accentuated in cases where the grass is relatively long and thin and may have a lower resilience to springing back to an upright orientation for a proper cut. Moisture on the bent over grass can also increase the difficulty of properly cutting this strip of bent over grass.

Therefore, a need exists for a lawn maintenance device having a set of ground engaging members that are positioned to provide a greater likelihood of drawing the bent over grass upward for a cut at a desired elevation of the grass blade.

SUMMARY

The following presents a simplified summary in order to provide a basic understanding of some example aspects of the disclosure. This summary is not an extensive overview. Moreover, this summary is not intended to identify critical elements of the disclosure nor delineate the scope of the disclosure. The sole purpose of the summary is to present some concepts in simplified form as a prelude to the more detailed description that is presented later.

According to one aspect, the subject application involves a lawn maintenance device having a transverse center line and a frame. The lawn maintenance device also includes a power source attached to the frame, and the power source includes an output shaft. The lawn maintenance device further includes a rotating cutting blade attached to the output shaft. The rotating cutting blade is configured to cut grass and vegetation as the lawn maintenance device passes over the grass and vegetation. The lawn maintenance device still further includes a left side located on a first side of the transverse center line and a right side located on a second side of the transverse center line. The lawn maintenance device also includes a plurality of ground engaging members rotatingly attached to the frame. The plurality of ground engaging members enable movement of the lawn maintenance device along an associated driven surface, and the plurality of ground engaging members includes a number of ground engaging members on the left side and a number of ground engaging members on the right side. The ground engaging members on the left side are located at a first distance from the transverse center line and the ground engaging members on the right side are located at a second distance from the transverse center line, the first distance is a different length than the second distance.

According to another aspect, the subject application involves a lawn maintenance device having a transverse center line and a frame. The lawn maintenance device also includes a power source attached to the frame, and the power source includes an output shaft. The lawn maintenance device further includes a rotating cutting blade attached to the output shaft. The rotating cutting blade is configured to cut grass and vegetation as the lawn maintenance device passes over the grass and vegetation. The rotating cutting blade includes an axis of rotation. The lawn maintenance device still further includes a left side located on a first side of the transverse center line and a right side located on a second side of the transverse center line. The lawn maintenance device also includes a plurality of ground engaging members rotatingly attached to the frame. The ground engaging members enable movement of the lawn maintenance device along an associated driven surface. The plurality of ground engaging members includes a number of ground engaging members on the left side and a number of ground engaging members on the right side. The ground engaging members on the left side are located at a first distance from the axis of rotation of the rotating cutting blade and the ground engaging members on the right side are located at a second distance from the axis of rotation of the rotating cutting blade. The first distance is a different length than the second distance.

BRIEF DESCRIPTION OF THE DRAWINGS

The foregoing and other aspects of the present disclosure will become apparent to those skilled in the art to which the present disclosure relates upon reading the following description with reference to the accompanying drawings, in which.

DETAILED DESCRIPTION

Figure 1:
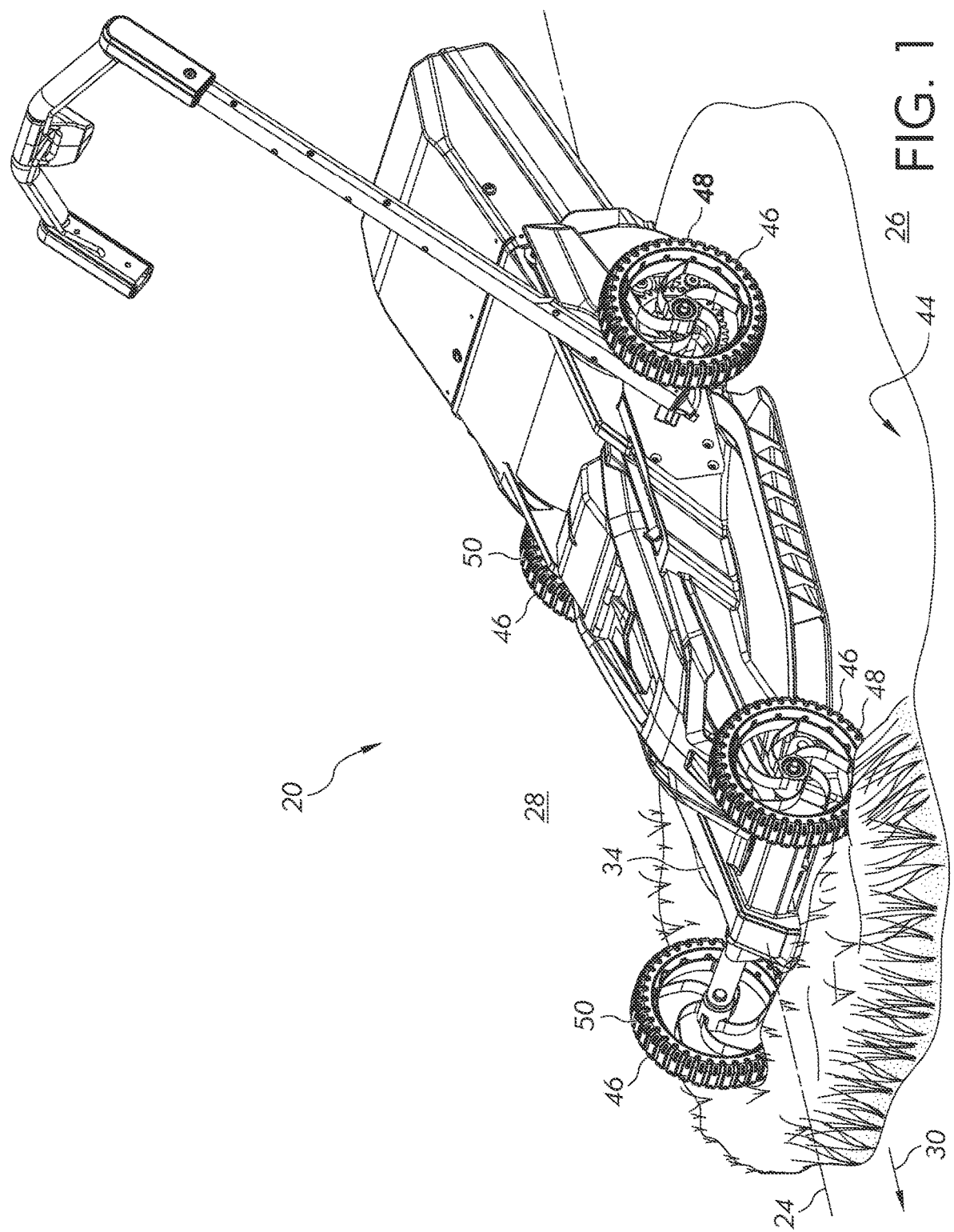
FIG. 1 is a perspective view of an example lawn maintenance device in accordance with aspects of the present disclosure.

Example embodiments that incorporate one or more aspects of the present disclosure are described and illustrated in the drawings. These illustrated examples are not intended to be a limitation on the present disclosure. For example, one or more aspects of the present disclosure can be utilized in other embodiments and even other types of devices. Moreover, certain terminology is used herein for convenience only and is not to be taken as a limitation on the present disclosure. Still further, in the drawings, the same reference numerals are employed for designating the same elements.

Referring to FIG. 1, an exemplary embodiment of a lawn maintenance device 20 having offset wheels is shown according to at least one aspect of the present disclosure. FIG. 1 shows a perspective view of a walk-behind mower which is one example of a lawn maintenance device 20. It is to be understood that construction and assembly structures of various lawn maintenance devices vary, and one example is shown in the figures and described herein. This is not meant to be a limiting example, and any suitable type of lawn maintenance device, particularly mowing devices, may be used in conjunction with the present disclosure.

The lawn maintenance device 20 includes a transverse center line represented by line 24. The transverse center line 24 separates a left side 26 of the lawn maintenance device 20 from a right side 28 of the lawn maintenance device 20. The left and right sides 26, 28 are in reference to the viewpoint of a walk-behind mower operator pushing the mower in what may generally considered a forward direction represented by arrow 30. The left side 26 is located on a first side of the transverse center line 24 while the right side 28 is located on a second side of the transverse center line 24. The lawn maintenance device 20 also includes a frame 34; the frame 34 can serve as a mounting platform for other structures of the lawn maintenance device 20. In some examples, the frame 34 can be a formed mower deck.

Figure 7:
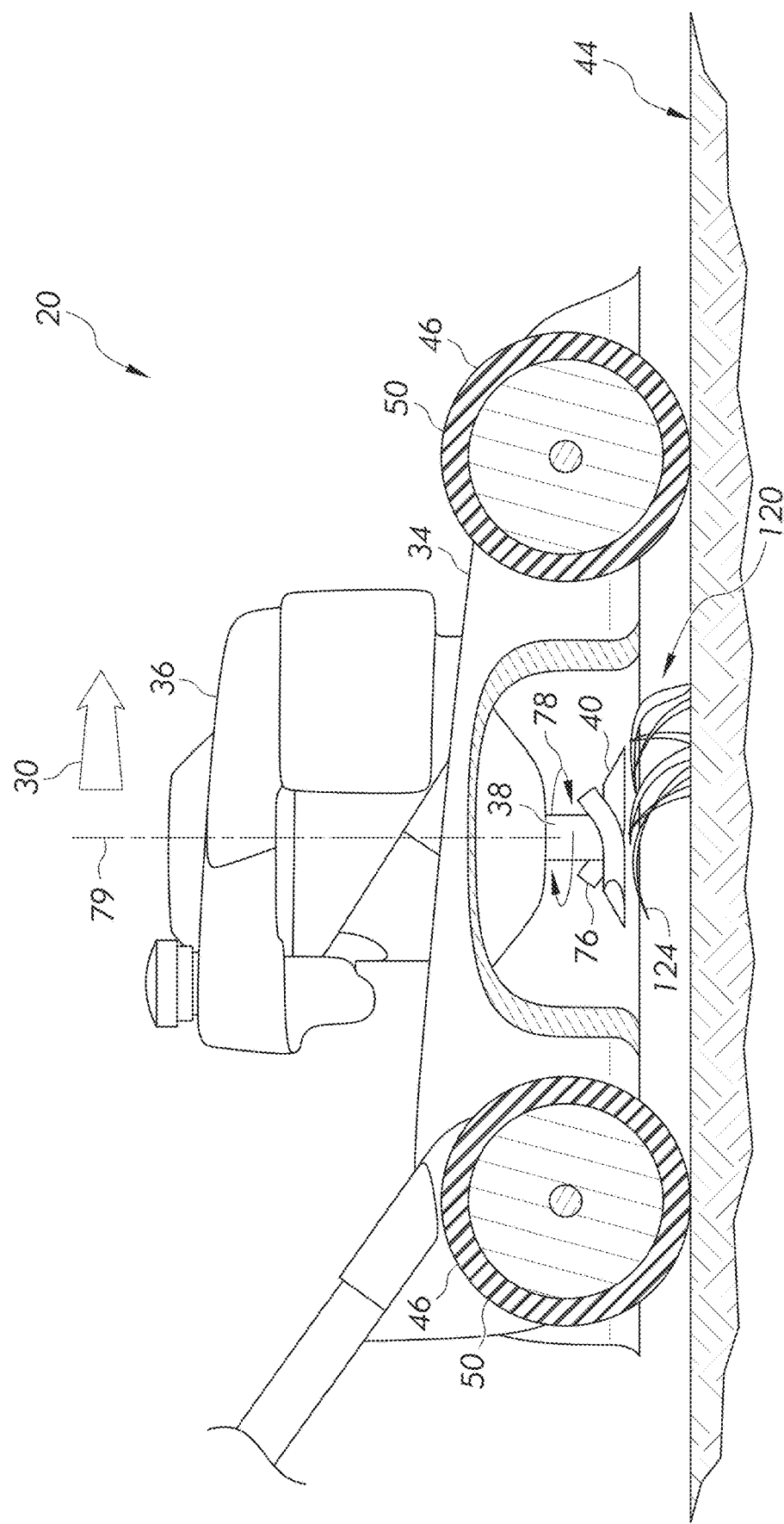
FIG. 7 is a partial cross-section view of the lawn maintenance device taken along line 7-7 of FIG. 2, showing the rotating cutting blade rotating in the same direction as the direction of the bent over grass.

For example, a power source 36 (best seen in FIG. 2) can be attached to the frame 34, wherein the power source 36 includes an output shaft 38 (best seen in FIG. 7). As is typical of many lawn mowers, the power source 36 can develop rotational power from any number of sources including, but not limited to, gasoline-powered internal combustion engines, electric motors powered by extension cords, electric motors having power provided by batteries, etc. The rotational power is transferred to a rotating cutting blade 40 (best seen in FIG. 7) that is attached to the output shaft 38. The rotating cutting blade 40 can be attached directly to the cutting blade 40, or may be connected through any number of power transmission devices such as belts, gears, shafts, etc. The rotating cutting blade 40 is configured to cut grass and vegetation as the lawn maintenance device 20 passes over the grass and vegetation on an associated driven surface 44.

Returning to FIG. 1, the lawn maintenance device 20 further includes a plurality of ground engaging members 46 rotatingly attached to the frame 34. The ground engaging members 46 enable movement of the lawn maintenance device 20 along the associated driven surface 44. The plurality of ground engaging members 46 includes a number of left side ground engaging members 48 on the left side 26 and a number of right side ground engaging members 50 on the right side 28.

Figure 2:
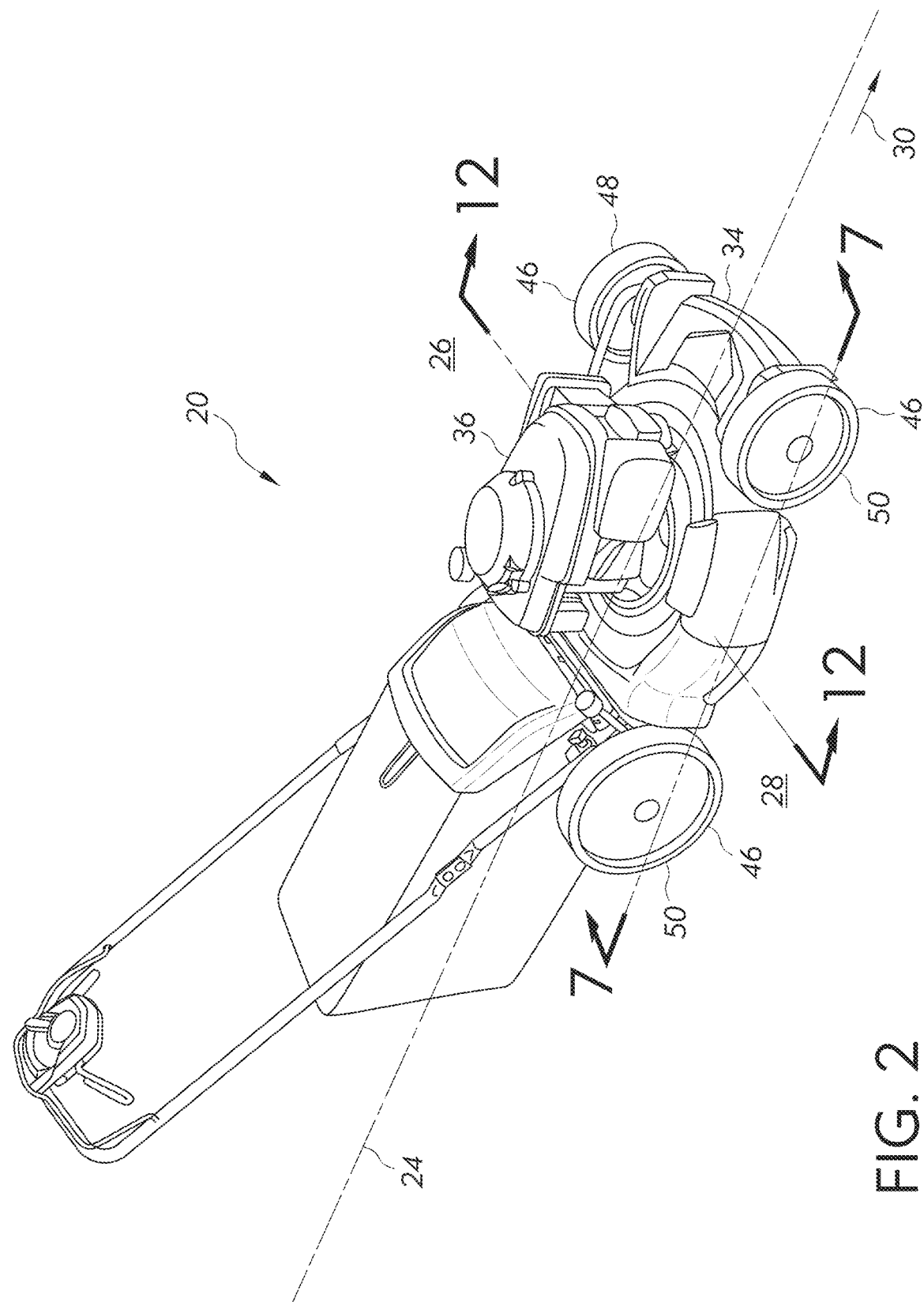
FIG. 2 is a perspective view of another example lawn maintenance device in accordance with aspects of the present disclosure.

FIG. 2 is a perspective view of a gasoline-powered walk-behind mower exemplary of the structure described in the present disclosure. Similar to the device of FIG. 1, the gasoline-powered walk-behind mower includes a transverse center line 24, a left side 26, a right side 28, and moves forward in the direction of arrow 30. The mower further includes ground engaging members 46 divided into left side ground engaging members 48 and right side ground engaging members 50.

Figure 4:
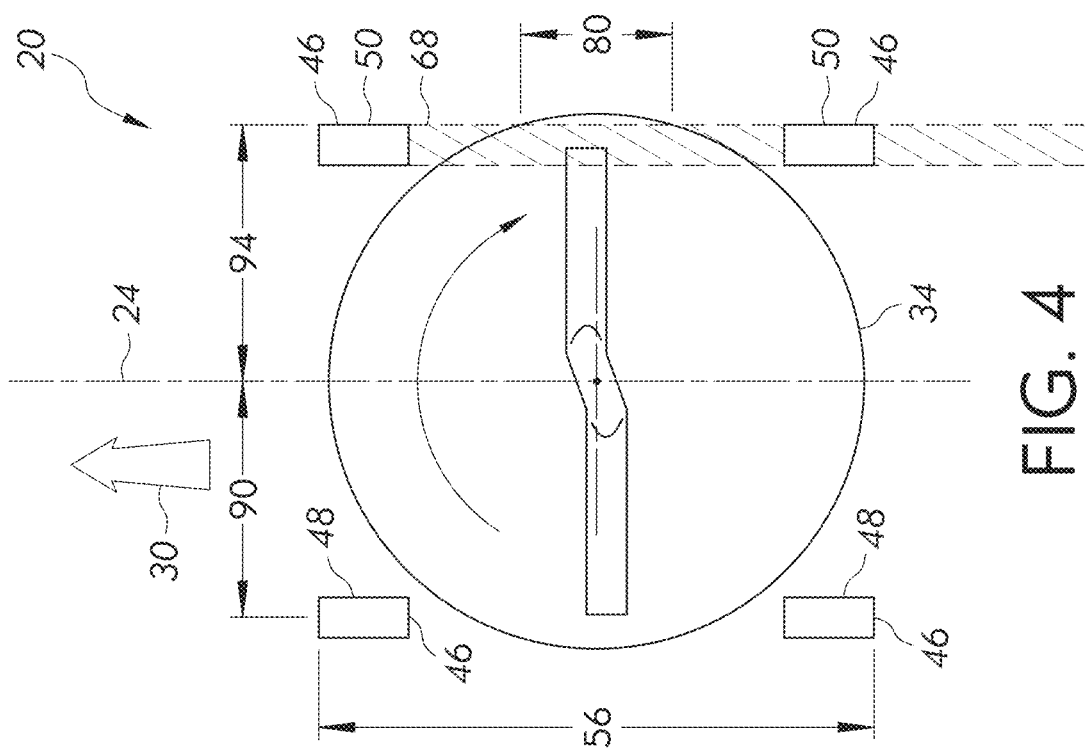
FIG. 4 is a plan view of an example mounting arrangement for ground engaging members of the lawn maintenance device of FIG. 2 showing the ground engaging members of both sides mounted at the same dimension from the transverse center line.
Figure 3:
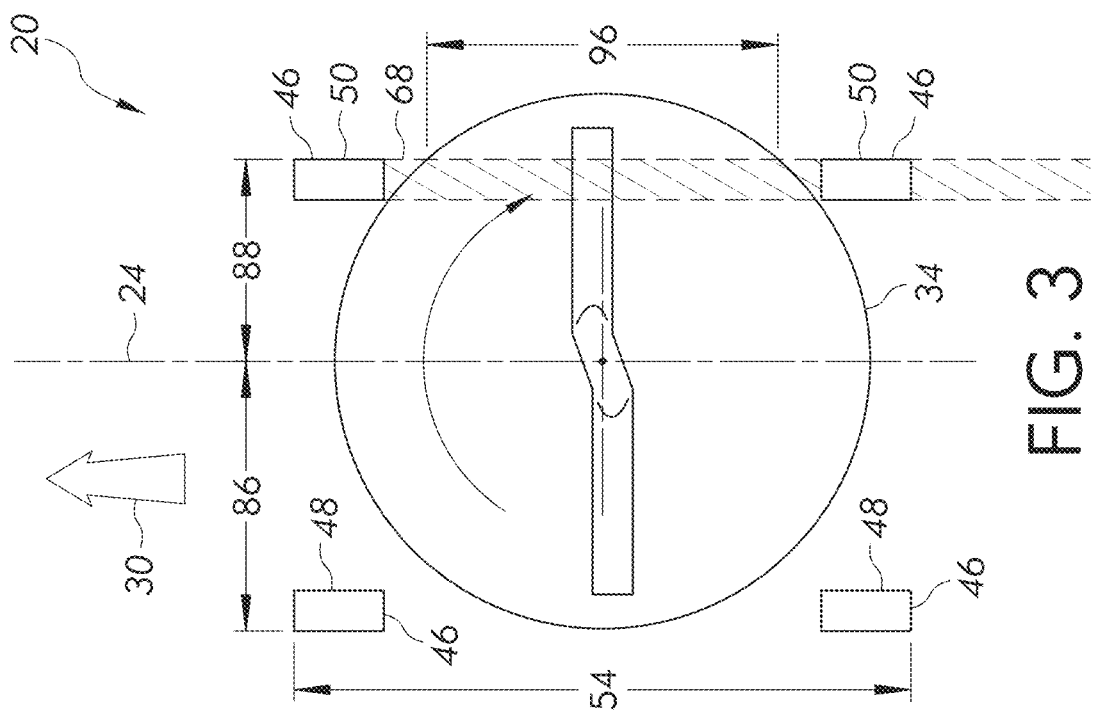
FIG. 3 is an plan view of an example mounting arrangement for ground engaging members of the lawn maintenance device of FIG. 2 showing the ground engaging members of one side mounted at a different dimension from a transverse center line than the ground engaging members of the other side.

Turning to FIGS. 3 and 4, a diagrammatic representation of a push mower circular deck and placement of wheels is shown. Many other structures of the mower are removed for clarity. During the design of most mowers, the placement of the ground engaging members 46 (e.g., wheels) can include a trade-off between wheel base length of the mower and effective trimming of the mower. For example, the front wheels of the mower in FIG. 3 are located farther forward while the rear wheels are located farther rearward than some mowers. This increases the wheelbase of the mower as represented by dimension 54 in comparison to the shorter wheelbase of the mower of FIG. 4, represented by dimension 56. It is worthy of note that the mower of FIG. 3 includes several areas around the circumference of the frame 34, or mower deck, that can provide close grass trimming around landscaping, posts, etc. Alternatively, while the mower of FIG. 4 gains a shorter wheelbase, it loses some ease of grass trimming around obstacles.

Figure 5:
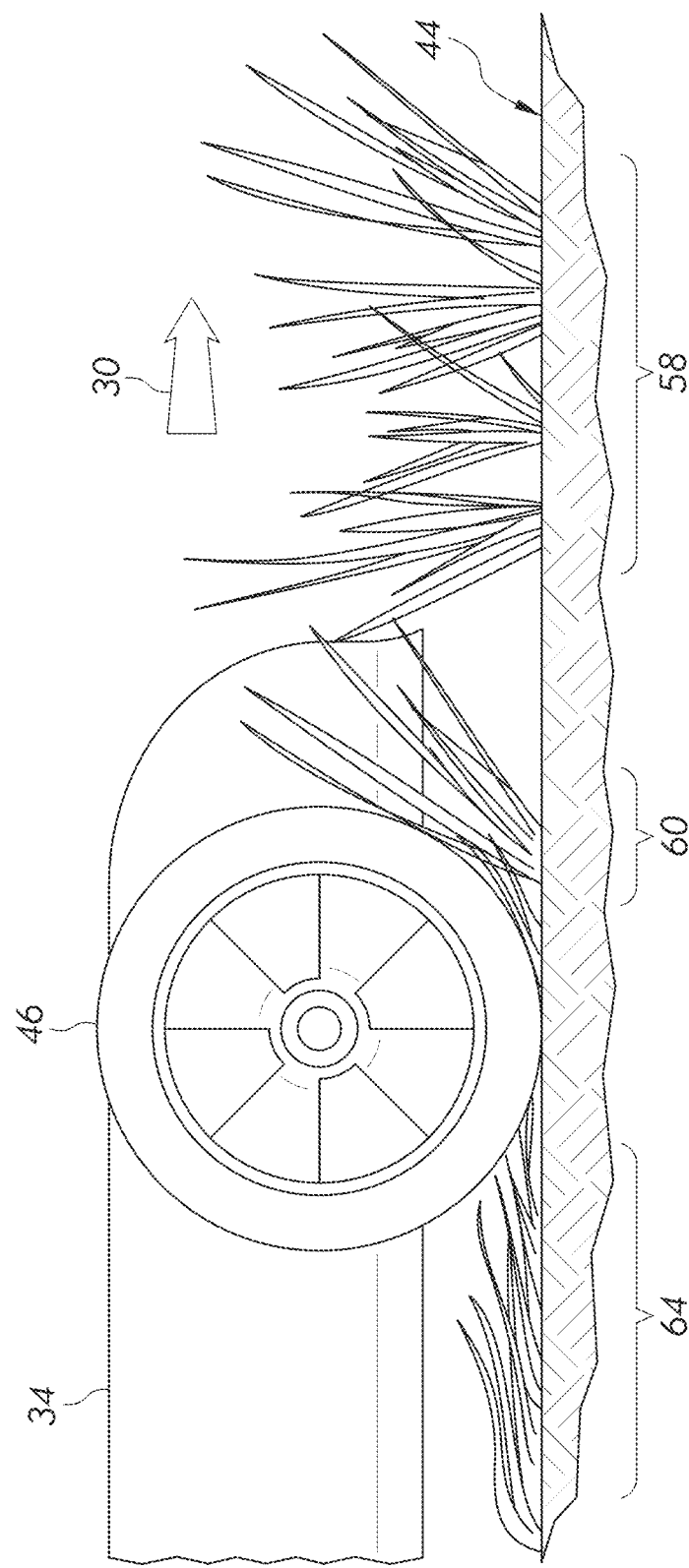
FIG. 5 is an elevation view of a portion of the lawn maintenance device of FIG. 2.

Turning to FIG. 5, an elevation view of a portion of an example lawn mower is shown. As is typical with many lawn mowers, the wheels can bend the blades of grass over which they travel as the lawn mower moves along the associated driven surface 44 in the forward direction represented by arrow 30. As an example, blades of grass that are in front of the mower's wheels (above reference numeral 58) tend to extend generally away from the associated driven surface 44 like typical growing grass. As the forward wheels come into contact with the blades of grass, as above reference numeral 60, the grass blades tend to be bent over in the forward direction. After the wheel passes over the grass, the blades of grass, such as those above reference numeral 64, tend to be bent over such that the tips of the grass blades point generally toward the forward direction 30 of the mower's travel path. The grass blades shown in FIG. 5 are intended to be within the path 68 as shown in FIGS. 3 and 4, among others.

Figure 6:
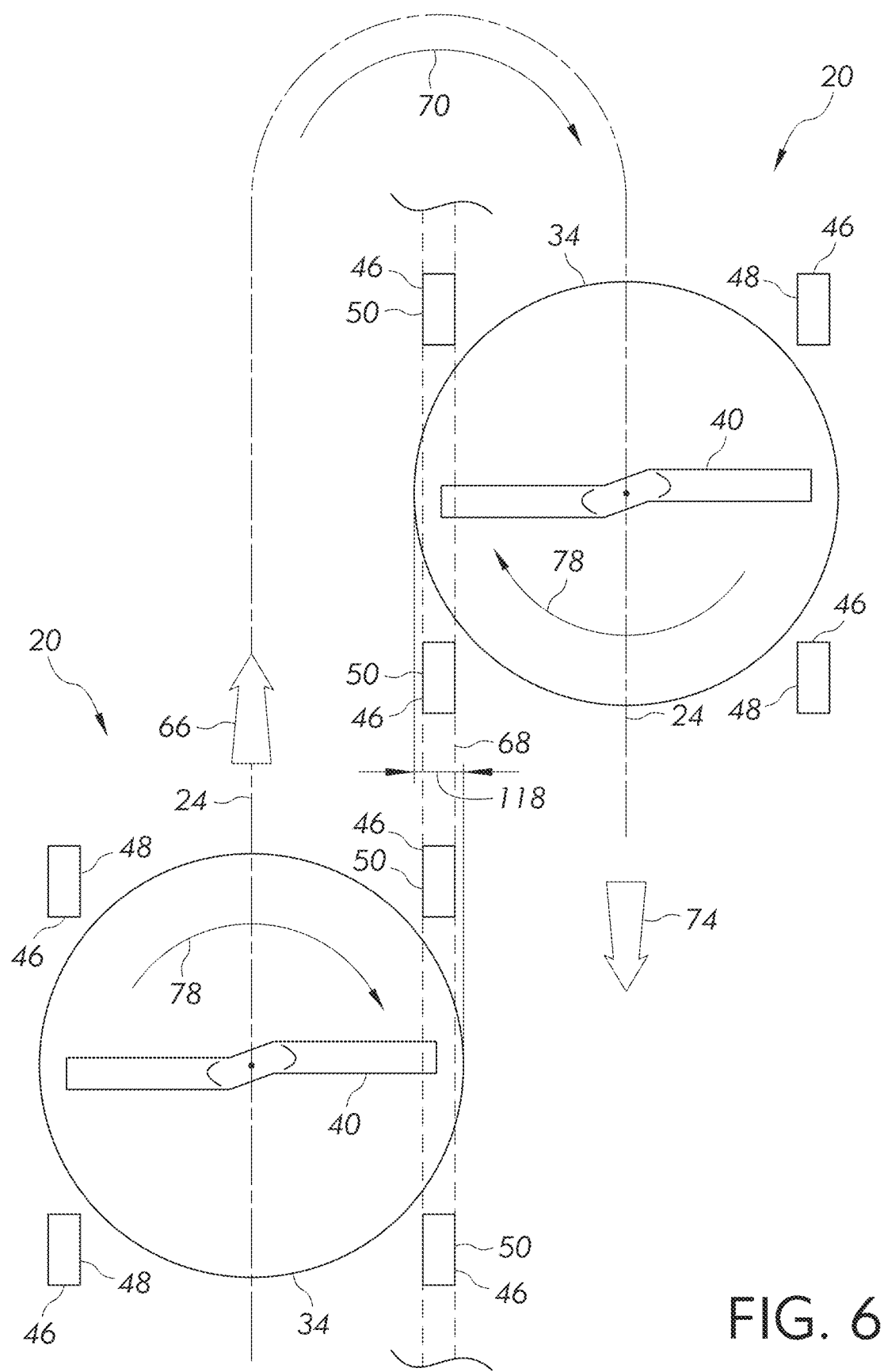
FIG. 6 is a plan view of the lawn maintenance device of FIG. 2 showing the ground engaging members of both sides mounted at the same dimension from the transverse center line, two side-by-side mowing paths, and a path of bent over grass.

Turning to FIG. 6, a diagram of a mower is shown while mowing a first path on the left side, turned 180° at the top of the figure (to the right), and then mowing a second path adjacent to the first path. The representation of the mower at left is shown cutting a path of grass in the direction of arrow 66. As noted, the wheels tend to bend over blades of grass that contact the wheels, pressed downward by the weight of the wheel and a portion of the mower. These bent over grass blades can form a path that is represented by the shaded area 68. For the sake of discussion, the path of bent over grass is shown only on one side of the mower, the right side in this case. When an operator has moved the mower to a desired turning location, such as a property line, landscaping, or an obstacle, the operator often turns the mower 180°, as represented by arrow 70 at the top of FIG. 6 and guides the mower to mow a second, adjacent path in the direction of arrow 74. The operator then often guides the mower to place the same right side wheels 50 on the path 68 of bent over grass as shown.

This process can, at times leave a particular linear arrangement of grass blades that are not effectively cut, thereby leaving an uneven appearance to the mown grass. In one particular example, the grass is of a relatively long length and has a relatively low resilience to spring back to a typical grass position (i.e., generally upright) in order to be cut by the rotating cutting blade 40.

Turning to FIG. 7, a cross-section view taken along line 7-7 of the example lawn maintenance device 20 of FIG. 2 is shown. Many known rotating cutting blades can provide a ramp or wing 76 to develop lower air pressure, or lift, above the blade that can more easily draw the blades of grass upright to promote a more even, uniform cut over an area of grass or vegetation. However, there are several factors that can, at times, decrease the effectiveness of the mowing operation. The cross-section view of FIG. 7 is taken through the right side ground engaging members 50 of the mower while the mower is cutting the second path of FIG. 6 (i.e., the path of the mower moving downward in FIG. 6). As such, the blades of grass are bent toward the rear of the mower as they were bent over in that direction by the right side ground engaging members 50 in the cutting operation of the first path. This orientation of bent over grass hinders the ability of the rotating cutting blade 40 to draw the blade of grass upward for a cut at its proper height. In other words, the rotating cutting blade 40 can sometimes ineffectively pass over the blades of grass when the blades of grass are bent over in the same direction as the direction of rotation of the rotating cutting blade 40 represented by arrow 78. FIG. 7 also shows the rotating cutting blade can include an axis of rotation 79 and the axis of rotation 79 intersects and is substantially perpendicular to the transverse center line 24. There are also examples wherein the axis of rotation 79 is positioned at an angle between 0° and 5° from the transverse center line 24 when viewed from the side. This angle can aid the grass cutting operation.

Therefore, the direction of rotation of the rotating cutting blade 40 and the bending direction of the bent over grass work against each other to inhibit the effective cutting of the grass. In other words, if the mower turned left at the top of FIG. 6 rather than right, the rotating cutting blade 40 would then be rotating in the opposite direction from the direction of the bent over grass, making it more likely to lift the grass and provide an effective cut. However, with the right turn as shown in FIG. 6, within the shaded area 68, the direction of rotation 78 of the rotating cutting blade 40 is in the same direction or orientation as the bent over grass. In other words, the blade is approaching the bent over grass from the bent over side, not the distal end of the grass blades.

Returning to FIGS. 3 and 4, at least two other factors can be shown that inhibit proper cutting of grass blades within the shaded area of the right wheels. FIG. 4 shows a typical wheel placement that places an outer edge of the right side wheels 50 close to or at the edge of the deck 34 of the lawn mower 20. The shaded portion 68 representing the path of bent over grass passes under the deck 34 to be cut by the rotating cutting blade 40. However, the length of the distance 80 that the grass blades within the shaded path pass under the deck (and thus the rotating cutting blade 40) is relatively short. This relatively short distance provides a relatively short time for the rotating cutting blade 40 to draw the bent over grass upward for a desired cut.

Additionally, this relatively short distance 80 and relatively short time of potential cutting opportunity also leads to fewer rotational passes of the rotating cutting blade 40 above the bent over grass that is to be drawn upward and cut. As such, the relatively few rotational passes of the rotating cutting blade 40 above the grass, relatively short distance of passage under the rotating cutting blade 40, and relatively short path under the deck 34 can combine to provide an inadequate cut of the bent over grass. Again, this may be more likely to happen with particular grass conditions such as relatively long, thin grass that may not have resilience to readily return to an upright position after being bent over by a mower wheel. The situation may be exacerbated further if the grass is damp or wet.

Figure 8:
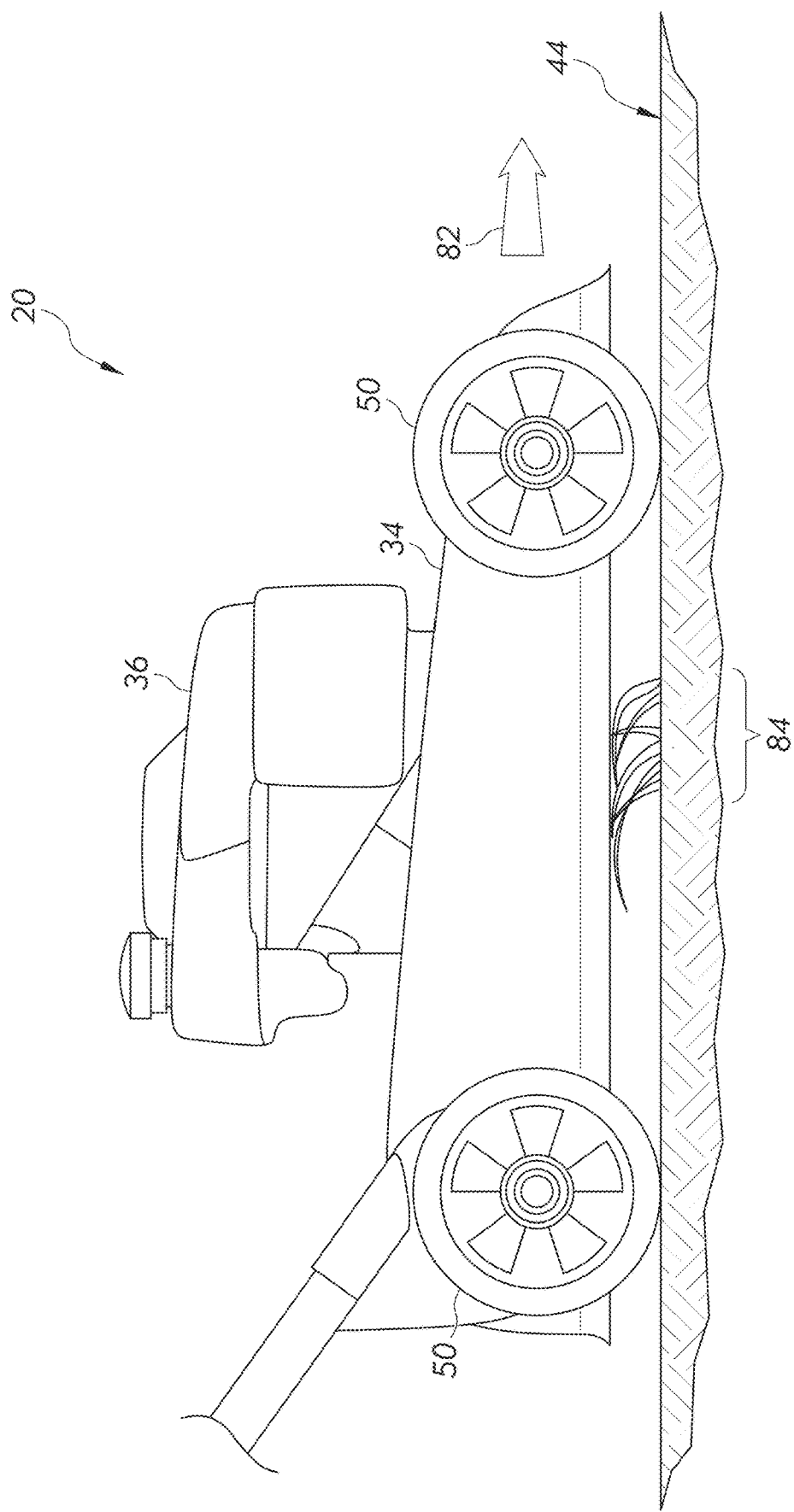
FIG. 8 is an elevation view of the lawn maintenance device of FIG. 2 showing an edge of a mower deck prevent full extension of bent over grass blades.

Turning to FIG. 8, another factor that may cause a path of grass having a less than satisfactory cut issue is illustrated in an elevation view of the right side of a lawn mower. The lawn mower is moving from left to right as represented by arrow 82. This mower movement corresponds to the previously described second path as shown in FIG. 6. Here, bent over grass blades above reference numeral 84 may pass under the edge of the deck 34, and the deck 34 can serve as an impediment to the blades of grass being drawn upward to be cut by the rotating cutting blade 40. In other words, the deck edge can present a physical barrier to the extension of the grass blades such that the blades are not cut properly.

Returning to FIG. 3, each of these described factors can be remedied by reducing the distance of the ground engaging members 46 on one of the left side 26 or the right side 28 from the transverse center line 24. In the example shown in FIG. 3, the right side ground engaging members 50 on the right side 28 of the lawn maintenance vehicle 20 are positioned closer to the transverse center line 24 than are the left side ground engaging members 48 on the left side 26. As such, the left side ground engaging members 48 on the left side 26 are located at a first distance 86 from the transverse center line 24 and the right side ground engaging members 50 on the right side 28 are located at a second distance 88 from the transverse center line 24. In this case, the first distance 86 is a different length than the second distance 88, and more specifically, the second distance 88 is less than the first distance 86. In comparison, the first distance 90 and second distance 94 as shown in the example mower of FIG. 4 are equal.

As was previously discussed, the distance 80 shown in FIG. 4 represents the distance that the grass blades within the shaded path pass under the deck (and thus under the rotating cutting blade 40). Note that this distance 80 is notably shorter than the distance 96 as shown in FIG. 3, the difference between the two distances being the right side ground engaging members 50 are moved inward toward the transverse center line 24 on the mower of FIG. 3. This movement of ground engaging members 46 can reduce and/or eliminate the blades of grass left uncut because of one or more of the following benefits. 1) The grass blades spend more time under the mower deck and are more likely to be drawn upward for cutting by the rotating cutting blade 40. 2)

The grass blades are subject to a greater number of passes under the rotating cutting blade 40. 3) The grass blades are less likely to be subject to being held down in a bent over position by a downward facing edge of the mower deck.

Figure 9:
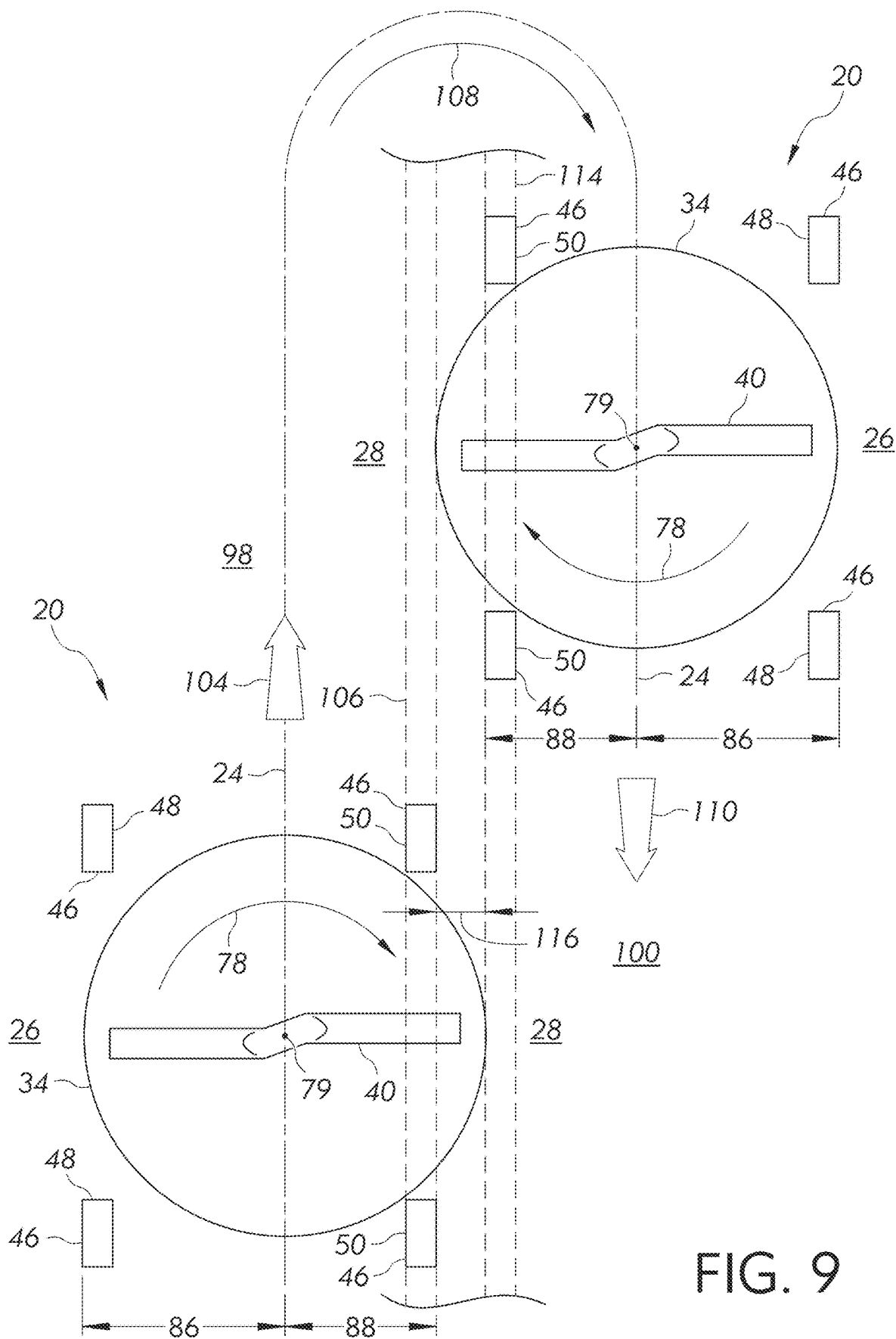
FIG. 9 is similar to FIG. 6 showing a plan view of the lawn maintenance device of FIG. 2 showing the ground engaging members of one side mounted at a dimension from the transverse center line that is different from the dimension from the transverse center line to the ground engaging members of the other side, two side-by-side mowing paths, and two paths of bent over grass.

Turning now to FIG. 9, a diagram of a mower is shown while mowing a first path 98 on the left side, turned 180° at the top of the figure (to the right), and then mowing a second path 100 adjacent to the first path. FIG. 9 is similar to FIG. 6, however, FIG. 9 shows the structure of reducing the distance of the ground engaging members 46 on the right side 28 from the transverse center line 24. In this example, the right side ground engaging members 50 on the right side 28 of the lawn maintenance vehicle 20 are positioned closer to the transverse center line 24 than are the left side ground engaging members 48 on the left side 26. As such, the left side ground engaging members 48 on the left side 26 are located at a first distance 86 from the transverse center line 24 and the right side ground engaging members 50 on the right side 28 are located at a second distance 88 from the transverse center line 24. In this case, the first distance 86 is a different length than the second distance 88, and more specifically, the second distance 88 (i.e., the right side) is less than the first distance 86 (i.e., the left side). The representation of the mower at left is shown cutting a path of grass in the direction of arrow 104. As noted, the wheels tend to bend over blades of grass that contact the wheels, pressed downward by the weight of the wheel and a portion of the mower. These bent over grass blades can form a path that is represented by the shaded area 106. For the sake of discussion, the path of bent over grass is shown only on one side of the mower, the right side in this case, and the grass is bent over in the direction of arrow 104. When an operator has moved the mower to a desired turning location, such as a property line, or an obstacle, the operator often turns the mower 180°, as represented by arrow 108 at the top of FIG. 9 and guides the mower to mow a second, adjacent path in the direction of arrow 110. The right side ground engaging members 50 create a second path of bent over blades of grass represented by the shaded area 114.

In the example shown in FIG. 9, the operator is positioning the mower on the second path 100 such that the mower deck has the same amount of overlap as the example shown in FIG. 6. For example, overlap dimension 116 of FIG. 9 is equal in length to the overlap dimension 118 of FIG. 6. However, as can be seen in FIG. 9, the paths of bent over grass 116, 118 are now well-within the boundary of the mower deck. As such, the number of grass blades left uncut or improperly cut within the paths 116, 118 will be eliminated or greatly reduced. In other examples, the operator can position the right side ground engaging members 50 along the line where the shaded area 106 was located for the first mower path (it may be difficult to discern as the bent over grass blades will have been more properly cut). This will provide even greater overlap, but may increase the time that is required to mow a particular area of driven surface 44.

It is also worthy of note that the location of the shorter of the first distance 86 and the second distance 88 can be determined by a direction of rotation 78 of the rotating cutting blade 40. Because of the relationship of the direction of rotation 78 of the rotating cutting blade 40 and the direction of the bent over grass inhibiting the ability of the rotating cutting blade 40 from drawing the blades of grass upward to produce a cut at a desired length, the ground engaging members 46 may be moved inward on a particular side 26, 28 based on the direction of rotation 78. For example, as shown in FIG. 7, when the rotating cutting blade 40 is approaching the bent over grass from a bent over side 120, and not a distal end 124, the grass blade requires greater effort to be drawn upward for a desired cut length. This greater effort may be provided by the grass blades spending a greater length of time under the mower deck during each pass of the lawn mower, or a greater number of blade passes above the bent over grass blades, or having the bent-over grass blade path be well within the edge of the mower deck such that the lower edge of the deck does not maintain the grass blades in a bent over position.

Figure 10:
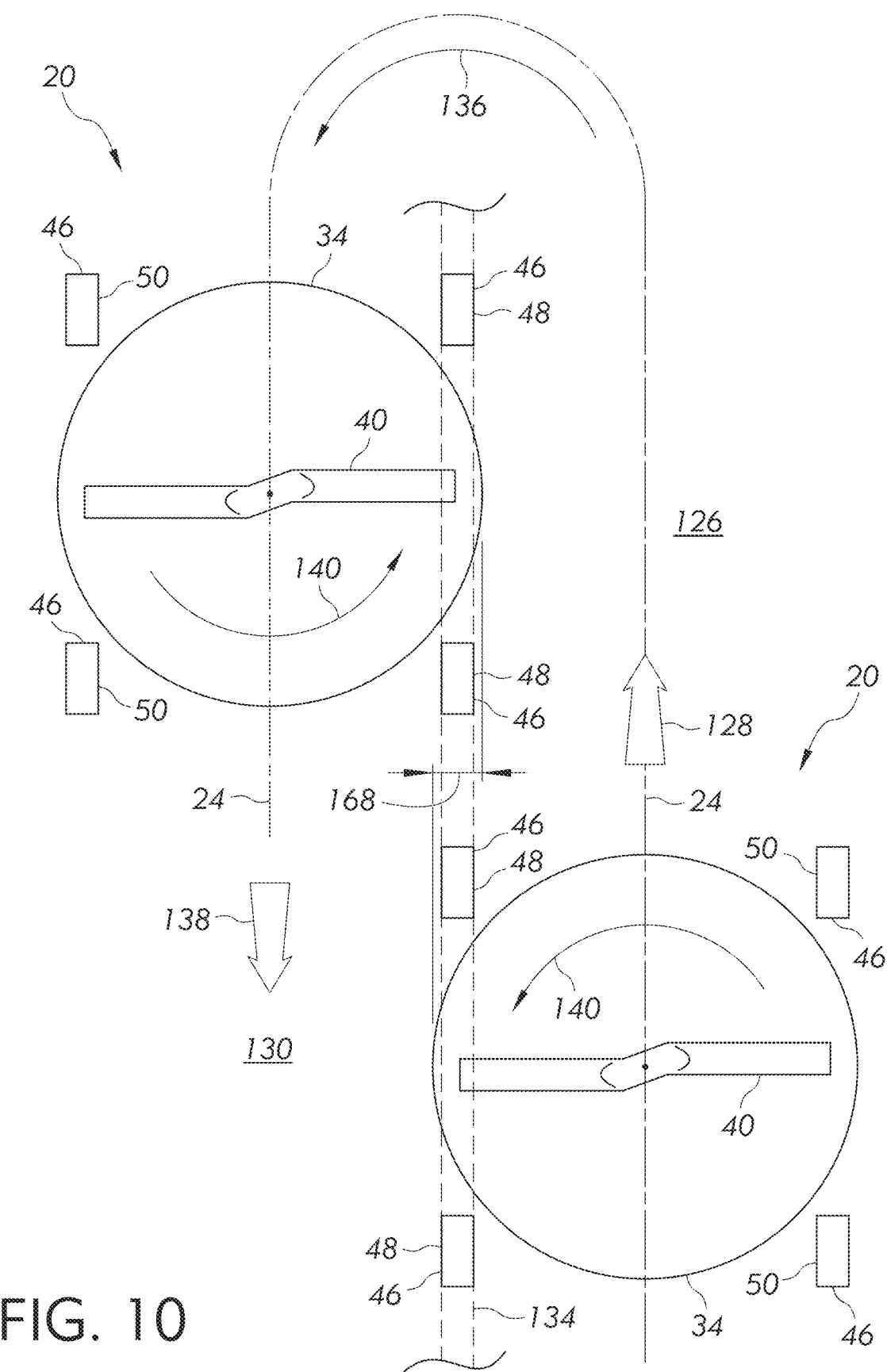
FIG. 10 is similar to FIG. 6 showing a rotating cutting blade rotating in a counter-clockwise direction, and turning the lawn maintenance device to the left at the end of a mowing path.
Figure 11:
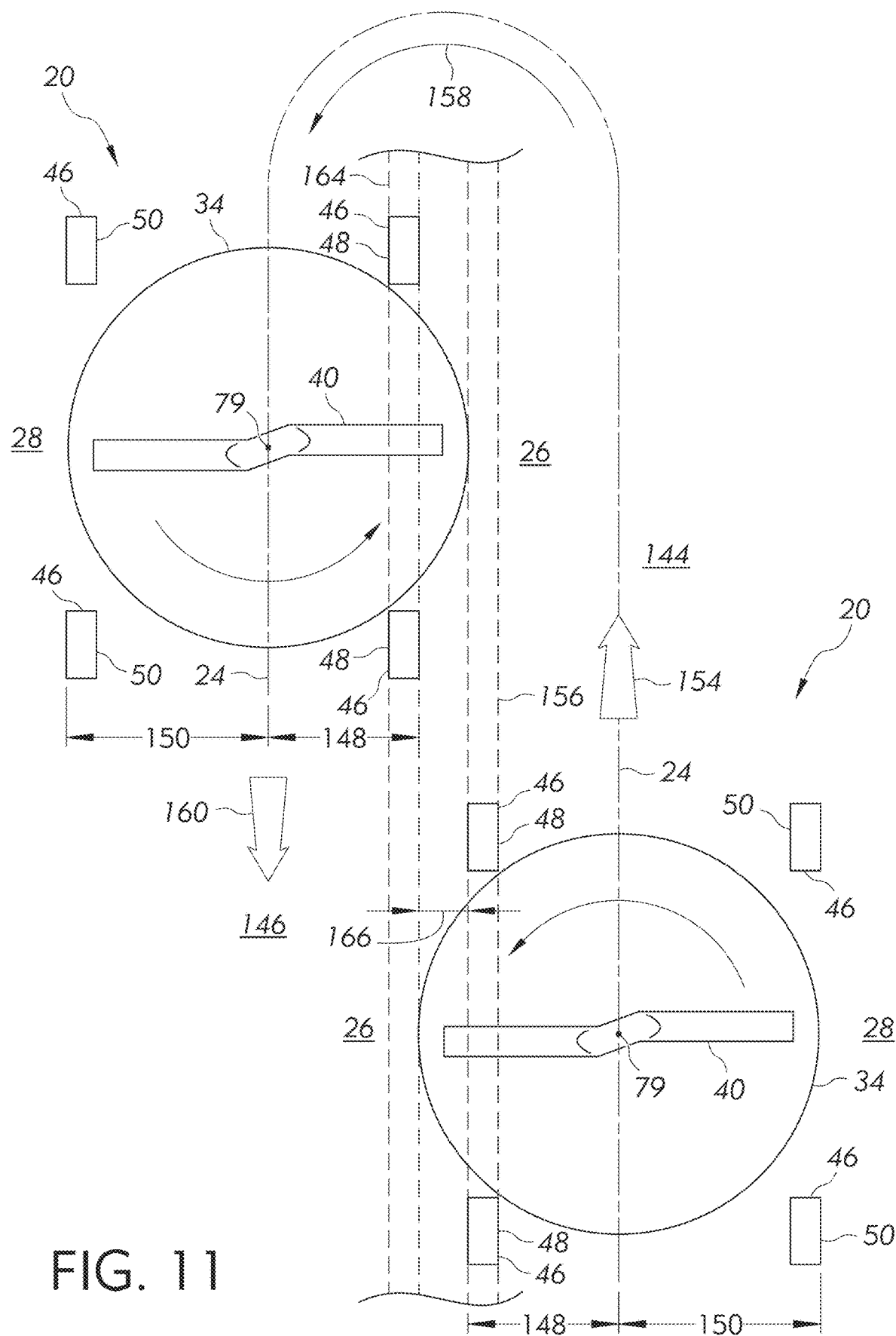
FIG. 11 is similar to FIG. 9 showing a rotating cutting blade rotating in a counter-clockwise direction, and turning the lawn maintenance device to the left at the end of a mowing path.

Turning to FIG. 10, a diagram of a mower is shown while mowing a first path 126 on the right side in the direction of arrow 128, turned 180° at the top of the figure (to the left), and then mowing a second path 130 adjacent to the first path 126. As noted, the wheels tend to bend over blades of grass that contact the wheels, pressed downward by the weight of the wheel and a portion of the mower. These bent over grass blades can form a path that is represented by a shaded area 134. For the sake of discussion, the path of bent over grass is shown only on one side of the mower, the left side in this case. When an operator has moved the mower to a desired turning location, such as a property line, or an obstacle, the operator often turns the mower 180°, as represented by arrow 136 at the top of FIG. 10 and guides the mower to mow the second path 130 in the direction of arrow 138. The operator then often guides the mower to place the same left side wheels on the path of bent over grass as shown. FIG. 10 is similar to FIG. 6, except that the direction of rotation 140 of the rotating cutting blade 40 is now counter-clockwise rather than the clockwise rotation of the rotating cutting blade 40 in FIG. 6. It is worthy of note that the blades of grass are bent over in the direction of arrow 128 from the first path 126 of the mower. As a result, the rotating cutting blade 40 will be passing over the bent over grass blade path 134 from the bent over side 120, and not the distal end 124 of the grass blades (best seen in FIG. 7), Turning now to FIG. 11, a diagram of a mower is shown while mowing a first path 144 on the right side, turned 180° at the top of the figure (to the left), and then mowing a second path 146 adjacent to the first path 144. FIG. 11 is similar to FIG. 10, however, FIG. 11 shows the structure of reducing the distance of the ground engaging members 46 on the left side 26 from the transverse center line 24. In this example, the left side ground engaging members 48 on the left side 26 of the lawn maintenance vehicle 20 are positioned closer to the transverse center line 24 than are the right side ground engaging members 50 on the right side 28. As such, the left side ground engaging members 48 on the left side 26 are located at a first distance 148 from the transverse center line 24 and the right side ground engaging members 50 on the right side 28 are located at a second distance 150 from the transverse center line 24. In this case, the first distance 148 is a different length than the second distance 150, and more specifically, the first distance 148 (i.e., the left side) is less than the second distance 150 (i.e., the right side). The representation of the mower at right is shown cutting a path of grass in the direction of arrow 154. As noted, the wheels tend to bend over blades of grass that contact the wheels, pressed downward by the weight of the wheel and a portion of the mower. These bent over grass blades can form a path that is represented by the shaded area 156. For the sake of discussion, the path of bent over grass is shown only on one side of the mower, the right side in this case, and the grass is bent over in the direction of arrow 154. When an operator has moved the mower to a desired turning location, such as a property line, or an obstacle, the operator often turns the mower 180°, as represented by arrow 158 at the top of FIG. 11 and guides the mower to mow a second, adjacent path in the direction of arrow 160. The left side ground engaging members 48 create a second path of bent over blades of grass represented by the shaded area 164.

In the example shown in FIG. 11, the operator is positioning the mower on the second path 146 such that the mower deck has the same amount of overlap as the example shown in FIG. 10. For example, overlap dimension 166 of FIG. 11 is equal in length to the overlap dimension 168 of FIG. 10. However, as can be seen in FIG. 11, the paths of bent over grass 156, 160 are now well-within the boundary of the mower deck. As such, the number of grass blades left uncut or improperly cut within the paths 156, 160 will be eliminated or greatly reduced. In other examples, the operator can position the left side ground engaging members 48 along the line where the shaded area 156 was located for the first path 144 (it may be difficult to discern as the bent over grass blades will have been more properly cut). This will provide even greater overlap, but may increase the time that is required to mow a particular area of driven surface 44.

As a brief summary, if the direction of rotation of the rotating cutting blade is clockwise, the second distance (i.e., the distance of the right side wheels from the center line of the mower) is shorter than the first distance (i.e., the distance of the left side wheels from the center line of the mower). Conversely, if the direction of rotation of the rotating cutting blade is counter-clockwise, the first distance (i.e., the distance of the left side wheels from the center line of the mower) is shorter than the second distance (i.e., the distance of the right side wheels from the center line of the mower).

Figure 12:
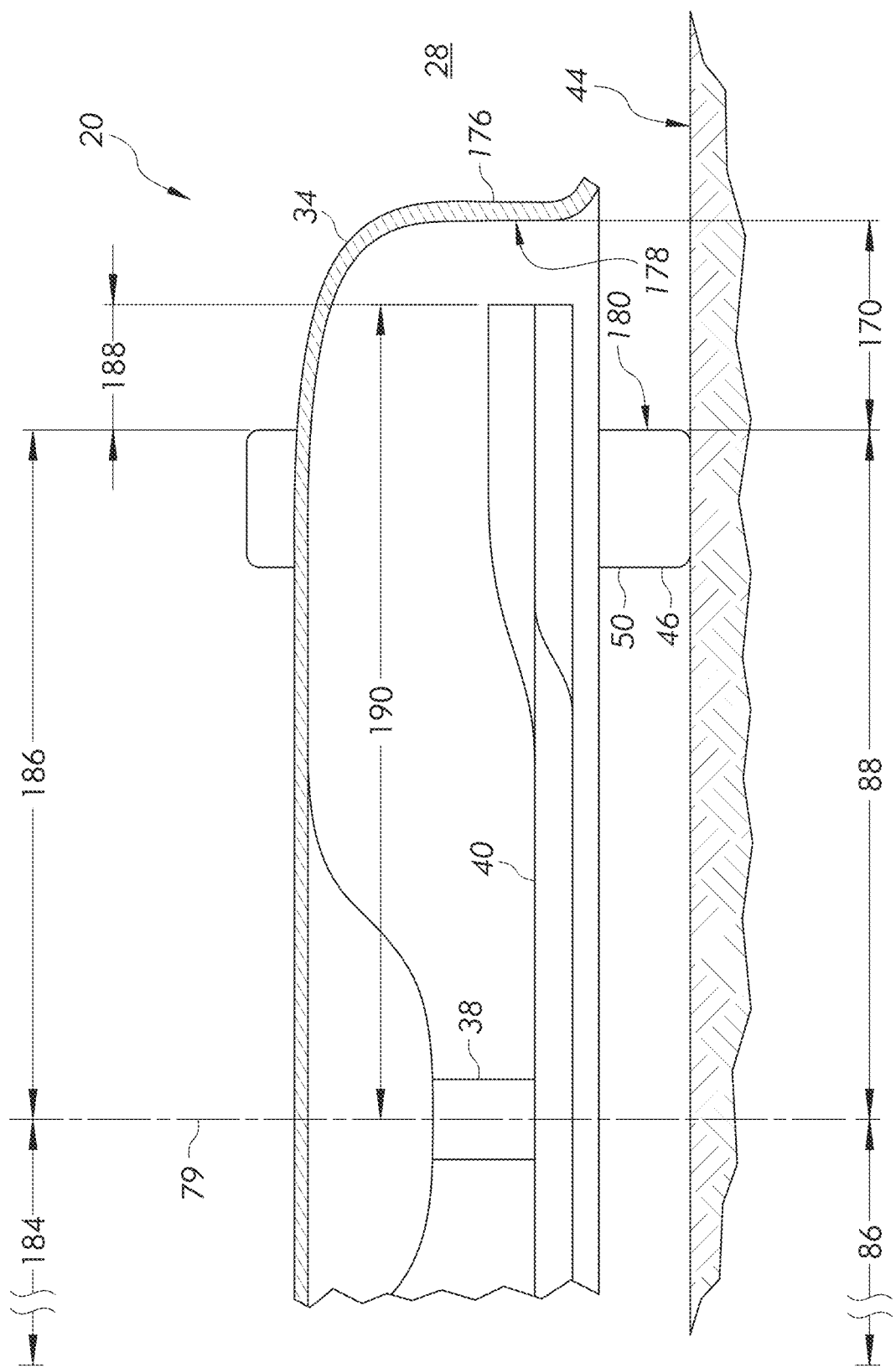
FIG. 12 is partial cross-section view taken along line 12-12 of FIG. 2 showing the relationship of a wheel location to both a cutting radius and an interior side of the mower deck.

Turning to FIG. 12, a cross-section view taken along line 12-12 of the example lawn maintenance device of FIG. 2 is shown. In some examples, it may be of particular value to place a particular length value on the shorter of the first distance 86 and the second distance 88, thereby defining dimension 170. In one example, the lawn maintenance device 20 can include a deck 34 that can include a downward extending portion 176. The downward extending portion 176 extends toward the associated driven surface 44 and has an interior side 178. The shorter of the first distance 86 and the second distance 88 positions ground engaging members 46 at a location represented by dimension 170 from the interior side 178 of the downward extending portion 176. To be more particular, the shown example, the second distance 88 is shorter such that an exterior side 180 of the right side ground engaging member 50 is 1½-inches distant from the interior side 178. As such, the shown example has a rotating cutting blade 40 that cuts while rotating in a clockwise direction. In one example, the dimension 170 can be between ½-inch and 2½-inches. In a more particular example, the dimension 170 can be between 1-inch and 2-inches. In a yet more particular example, the dimension 170 can be about 1½-inches.

It is to be understood that if the lawn maintenance vehicle includes a rotating cutting blade 40 that operates in a counter-clockwise rotation, the dimensions of FIG. 12 can likewise apply to the left side 26 of the mower when the first distance 86 is shorter than the second distance 88.

Remaining with FIG. 12, there are other examples wherein the right side ground engaging members 50 on the right side 28 are located at a first distance 184 from the axis of rotation 79 of the rotating cutting blade 40 and the right side ground engaging members 50 on the right side 28 are located at a second distance 186 from the axis of rotation 79 of the rotating cutting blade 40. As described with other examples, the first distance 184 is a different length than the second distance 186. The rotating cutting blade 40 operates clockwise in the shown example, and the second distance 186 is shorter than the first distance 184. At times, it can be worthwhile to design the second distance 186 to have a particular value, such that the right side ground engaging members 50 are located at a particular distance (represented by dimension 188) from the cutting radius 190 of the rotating cutting blade 40. In one example, the dimension 188 can be between ½-inch and 2½-inches. In a more particular example, the dimension 188 can be between 1-inch and 2-inches. In a yet more particular example, the dimension 188 can be about 1½-inches.

Figure 13:
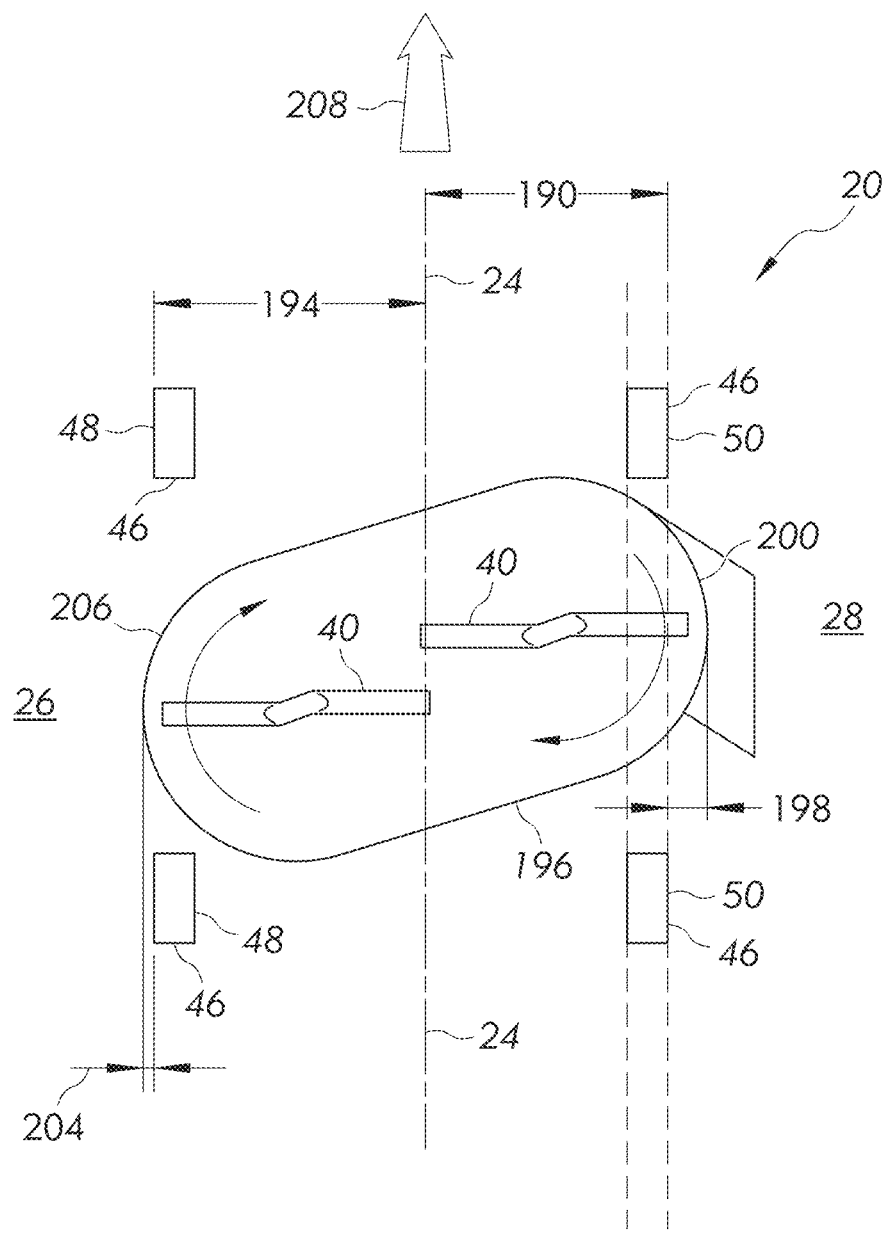
FIG. 13 is a plan view of a mower having multiple rotating cutting blades.

Turning to FIG. 13, a schematic of a mower using more than one rotating cutting blade 40 is shown. The example mower can be a walk-behind mower having more than one rotating cutting blade 40, or a riding mower having more than one rotating cutting blade 40. In the shown example, the right side ground engaging members 50 are located at a shorter distance 190 to the transverse center line 24 than the distance 194 of the left side ground engaging members 48 to the transverse center line 24. In another example, the right side ground engaging members 50 are located based on dimensions from the right side of the deck 196. Dimension 198 represents a longer distance of the location of the right side ground engaging members 50 from the right side 200 of the deck 196 than a dimension 204 determining the distance of the left side ground engaging members 48 from a left side 206 of the deck 196. The mower is shown moving forward in the direction of arrow 208.

The apparatus disclosed herein can provide several benefits. As noted previously, there are instances when the path of the mower wheels do not bend the blades of grass badly enough such that the mower provides a relatively ineffective cut on a strip of grass bent by the wheels. However, in some circumstances, particularly when the grass is of a relatively long length, is relatively thin, and has a relatively low resilience to spring back to a typical grass position (i.e., generally upright) the bent over strips can be problematic. The problem can be exacerbated by turns to the right while the blade rotates in a clockwise direction or turns to the left while the blade rotates in a counter-clockwise direction. However, the described apparatus can reduce and/or eliminate the issue such that a mower operator can make mower turns in any direction without worrying about relatively poor grass cuts in thin strips along one side of the mower. Additionally, the above described apparatus can provide more effective mowing, saving time and effort for the operator.

While this disclosure has been written in conjunction with the specific embodiments described above, it is evident that many alternatives, combinations, modifications and variations are apparent to those skilled in the art. Accordingly, the described embodiments of this disclosure, as set forth above are intended to be illustrative only, and not in a limiting sense. Various changes can be made without departing from the spirit and scope of this disclosure. Combinations of the above embodiments and other embodiments will be apparent to those of skill in the art upon studying the above description and are intended to be embraced therein. Therefore, the scope of the present disclosure is defined by the appended claims, and all devices, processes, and methods that come within the meaning of the claims, either literally or by equivalence, are intended to be embraced therein. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A lawn maintenance device including a transverse center line comprising:
a frame;
a power source attached to the frame, wherein the power source includes an output shaft;
a rotating cutting blade attached to the output shaft, wherein the rotating cutting blade is configured to cut grass and vegetation as the lawn maintenance device passes over the grass and vegetation;
a left side located on a first side of the transverse center line;
a right side located on a second side of the transverse center line; and
a plurality of ground engaging members rotatingly attached to the frame, wherein the ground engaging members enable movement of the lawn maintenance device along an associated driven surface, the plurality of ground engaging members includes a number of ground engaging members on the left side and a number of ground engaging members on the right side;
wherein the ground engaging members on the left side are located at a first distance from the transverse center line and the ground engaging members on the right side are located at a second distance from the transverse center line, the first distance is a different length than the second distance;
wherein one of the first distance and the second distance is less than the other of the first distance and the second distance, and the location of the shorter of the first distance and the second distance is determined by a direction of rotation of the rotating cutting blade;
wherein if the direction of rotation of the rotating cutting blade is counter-clockwise, the first distance is shorter than the second distance; and
wherein the rotating cutting blade further comprises an axis of rotation and the axis of rotation intersects and is substantially perpendicular to the transverse center line.

2. A lawn maintenance device including a transverse center line comprising:
a frame;
a power source attached to the frame, wherein the power source includes an output shaft;
a rotating cutting blade attached to the output shaft, wherein the rotating cutting blade is configured to cut grass and vegetation as the lawn maintenance device passes over the grass and vegetation;
a left side located on a first side of the transverse center line;
a right side located on a second side of the transverse center line; and
a plurality of ground engaging members rotatingly attached to the frame, wherein the ground engaging members enable movement of the lawn maintenance device along an associated driven surface, the plurality of ground engaging members includes a number of ground engaging members on the left side and a number of ground engaging members on the right side;
wherein the ground engaging members on the left side are located at a first distance from the transverse center line and the ground engaging members on the right side are located at a second distance from the transverse center line, the first distance is a different length than the second distance;
wherein one of the first distance and the second distance is less than the other of the first distance and the second distance, and the location of the shorter of the first distance and the second distance is determined by a direction of rotation of the rotating cutting blade;
a deck, wherein the deck includes a downward extending portion, the downward extending portion extends toward the associated driven surface and has an interior side,
wherein the shorter of the first distance and the second distance positions ground engaging members about 1½ inches from the interior side of the downward extending portion; and
wherein if the direction of rotation of the rotating cutting blade is clockwise, the second distance is shorter than the first distance.

3. A lawn maintenance device including a transverse center line comprising:
a frame;
a power source attached to the frame, wherein the power source includes an output shaft;
a rotating cutting blade attached to the output shaft, wherein the rotating cutting blade is configured to cut grass and vegetation as the lawn maintenance device passes over the grass and vegetation;
a left side located on a first side of the transverse center line;
a right side located on a second side of the transverse center line; and
a plurality of ground engaging members rotatingly attached to the frame, wherein the ground engaging members enable movement of the lawn maintenance device along an associated driven surface, the plurality of ground engaging members includes a number of ground engaging members on the left side and a number of ground engaging members on the right side;
wherein the ground engaging members on the left side are located at a first distance from the transverse center line and the ground engaging members on the right side are located at a second distance from the transverse center line, the first distance is a different length than the second distance;
wherein one of the first distance and the second distance is less than the other of the first distance and the second distance, and the location of the shorter of the first distance and the second distance is determined by a direction of rotation of the rotating cutting blade;
wherein the rotating blade includes a cutting radius,
wherein the shorter of the first distance and the second distance positions ground engaging members about 1½ inches from the interior side of the cutting radius; and
wherein if the direction of rotation of the rotating cutting blade is clockwise, the second distance is shorter than the first distance.

4. The lawn maintenance device according to claim 3, wherein if the direction of rotation of the rotating cutting blade is counter-clockwise, the first distance is shorter than the second distance.

* * * * *

UNITED STATES PATENT AND TRADEMARK OFFICE
CERTIFICATE OF CORRECTION

PATENT NO. : 11,547,047 B2
APPLICATION NO. : 15/991524
DATED : January 10, 2023
INVENTOR(S) : A. Schaedler et al.

It is certified that error appears in the above-identified patent and that said Letters Patent is hereby corrected as shown below:

In the Claims

Column 12, Line 53, delete "interior side of the".

Signed and Sealed this
Fourteenth Day of March, 2023

Katherine Kelly Vidal
*Director of the United States Patent and Trademark Office*